D. J. PITTS.
HARVESTER.
APPLICATION FILED NOV. 1, 1916.
1,217,629.
Patented Feb. 27, 1917.
3 SHEETS—SHEET 2.
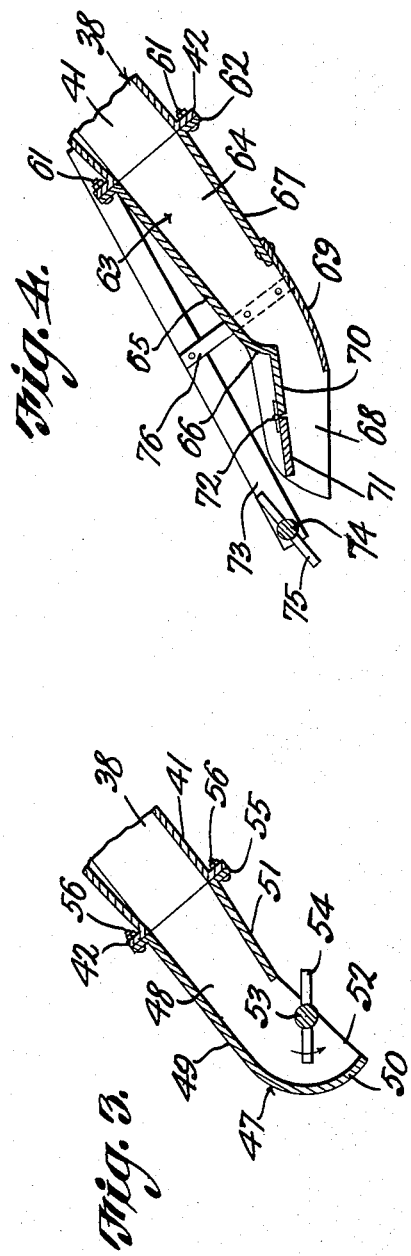
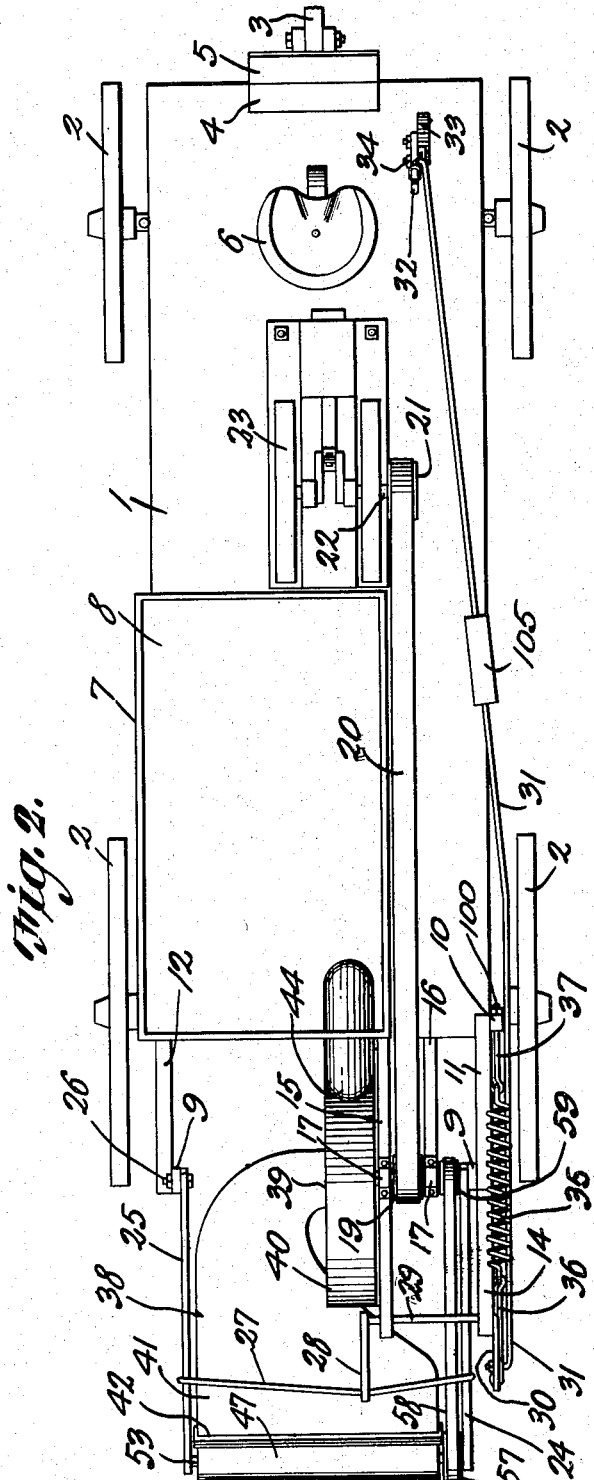
Witnesses
D. J. Pitts, Inventor
by C. A. Snow & Co., Attorneys

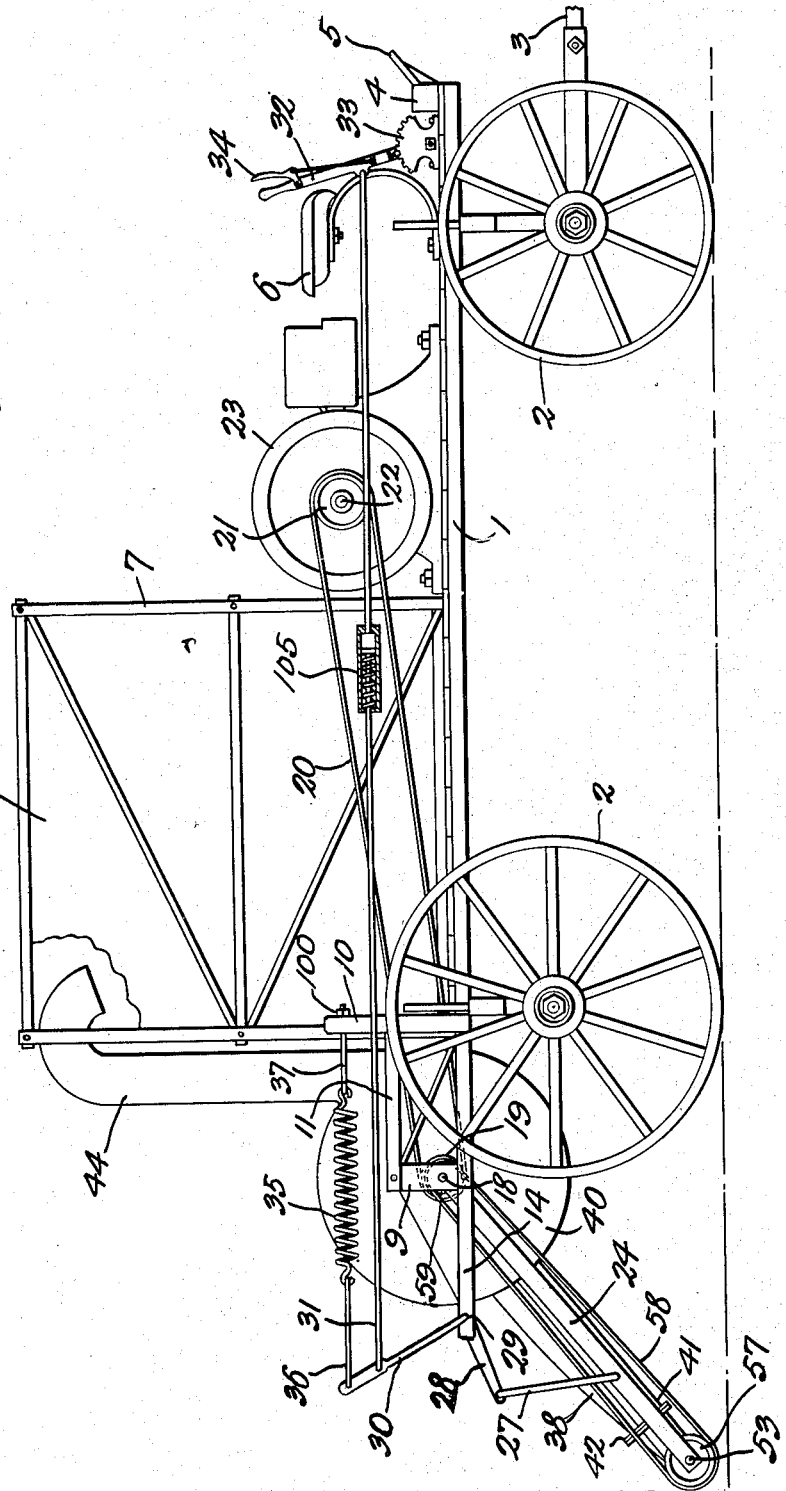

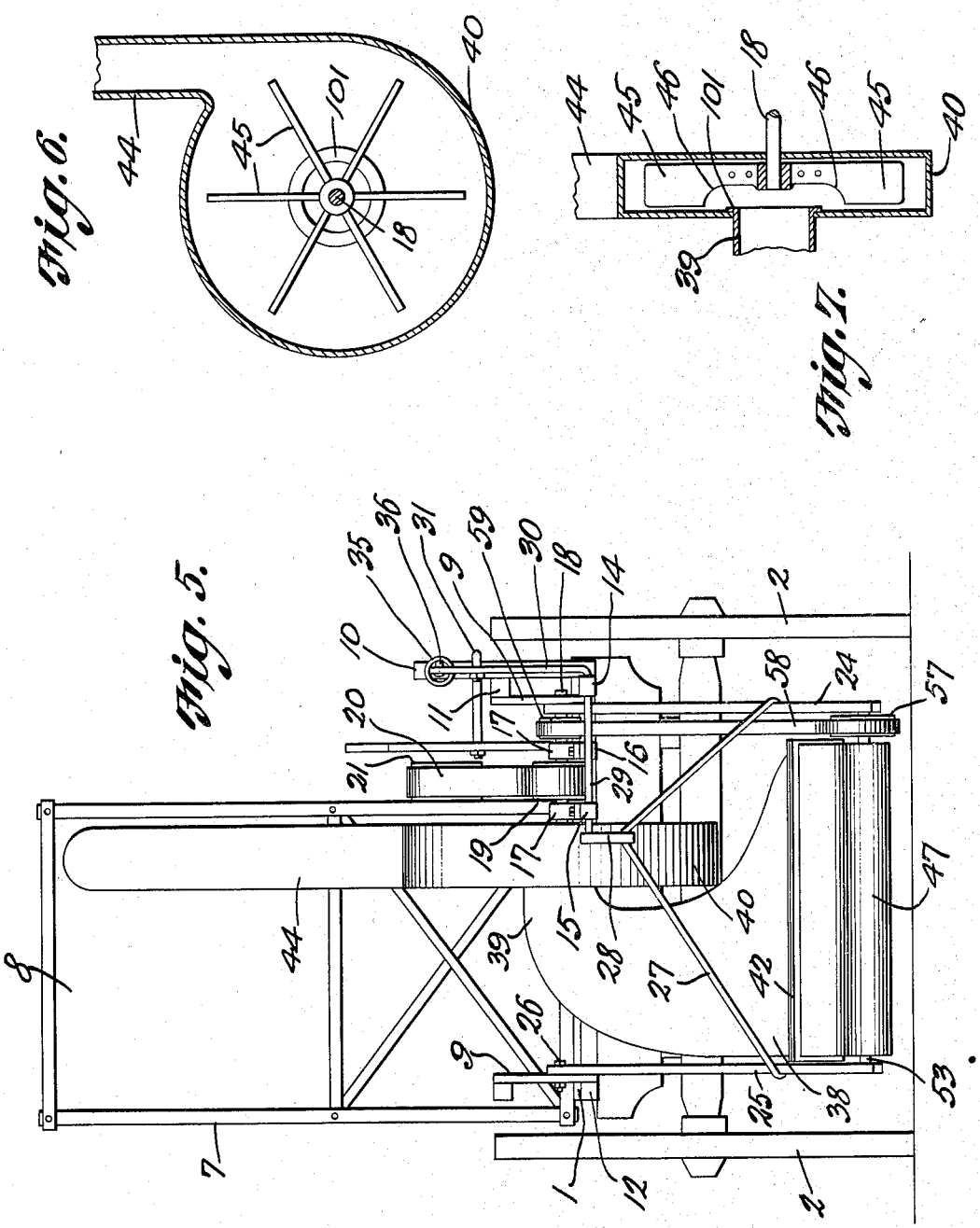

UNITED STATES PATENT OFFICE.

DAVID JACKSON PITTS, OF BOWMAN, GEORGIA.

HARVESTER.

1,217,629.  Specification of Letters Patent.  Patented Feb. 27, 1917.

Application filed November 1, 1916. Serial No. 128,948.

*To all whom it may concern:*

Be it known that I, DAVID J. PITTS, a citizen of the United States, residing at Bowman, in the county of Elbert and State of Georgia, have invented a new and useful Harvester, of which the following is a specification.

The device forming the subject matter of this application is adapted to be employed for harvesting crimson clover seed, bur clover seed, alfalfa seed or any other seed of a similar sort.

The invention aims to provide novel means for collecting the clover seed by suction, and for conveying the seed to a suitable receptacle, from which it may be removed, and threshed, or otherwise treated or used.

A further object of the invention is to provide novel means for driving the tedding members, and to provide novel means for adjusting vertically, the suction heads whereby the seed is collected.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made without departing from the scope of what is claimed, without departing from the spirit of the invention.

In the accompanying drawings:—

Figure 1 shows in side elevation, a clover seed harvester constructed in accordance with the present invention;

Fig. 2 shows in top plan, a clover seed harvester wherein the present improvements are embodied;

Fig. 3 is a fragmental vertical section taken through one of the suction heads;

Fig. 4 is a fragmental vertical section taken through a modified form of suction head;

Fig. 5 shows in rear elevation, a clover seed harvester embodying the present invention;

Fig. 6 is a fragmental section taken through the casing of the combined blower and suction device; and Fig. 7 is a cross section of the structure shown in Fig. 6.

In carrying out the present invention there is provided a vehicle which may be of any desired construction. In the present instance, the vehicle has been shown as an ordinary farm wagon including a platform 1 carrying ground wheels 2, a draft means for the wagon being indicated conventionally at 3. The device need not be drawn by animals, but may be motor-propelled. The forward end of the platform 1 may carry a tool box 4 supporting a foot board 5, and the platform may be equipped adjacent its forward end or elsewhere with a seat 6.

Fixed to and rising from the platform 1 is a frame 7 supporting a receptacle 8.

Projecting rearwardly from the platform 1 are bars 12, 14, 16 and 15. The bars 12 and 16 are somewhat shorter than the bars 15 and 14. The bars 14 and 12 carry standards 9. A post 10 is erected on the platform 1 near the rear corner thereof. A brace 11 connects the post 10 with one of the standards 9. Mounted on the bars 16 and 15 are bearings 17. In the bearings 17 and in one of the standards 9 is journaled a shaft 18 carrying a pulley 19 about which is trained a belt 20 engaging a pulley 21 on the shaft 22 of an internal combustion engine 23 or other motor mounted on the platform 1 near to the forward end of the platform.

The invention comprises a vertically swinging frame including a pair of arms 24 and 25. The arm 25 is pivoted as shown in Fig. 2 on one of the standards 9, the arm 24 being mounted to swing on the shaft 18. The pivotal connection between the arm 25 and the standard 9 on the bar 12 is denoted by the reference numeral 26. At 27 there appears an upstanding V-shaped yoke, the lower ends of which are pivoted to the arms 24 and 25 of the vertically swinging frame above mentioned. The upper portion of the yoke 27 is pivoted to the rear end of an arm 28 connected rigidly with a rock shaft 29 journaled in the bars 14 and 15. The rock shaft 29 has an upstanding arm 30 united by means of a connection 31, which may be a rod, with a lever 32 fulcrumed on a segment 33 carried by the platform 1 adjacent the forward end of the platform. The lever 32 has a latch mechanism 34 of any desired kind, coöperating with the segment 33. The numeral 35 denotes a retractile spring, the rear end of which is detachably connected with a rod 36 pivoted to the upper end of the arm 30 of the rock shaft 29. The forward end of the spring 35 is detachably connected with a rod 37 projecting through the post 10. A nut 100 is threaded onto the forward end of the rod 37 and, coacting with the post 10, constitutes a means whereby the tension of the spring 35 may be adjusted.

The numeral 38 denotes generally, a tubular chute including a reduced neck 39 which is laterally extended, and is journaled, as indicated at 101 in the side wall of a blower casing 40 carried by the bar 15. In Fig. 5, the neck 39 is shown at the left hand side of the vehicle, but a skilled mechanic by a simple reversal, can locate the neck 39 and attendant parts at the right hand side of the vehicle. The chute 38 includes a rear end 41 which is extended laterally so that it substantially fills the space between the arms 25 and 24 of the vertically swinging frame. The end 41 of the chute 38 has a flange 42. A pipe 44 leads from the blower casing 40 to the receptacle 8 and discharges thereinto. Blades 45 are attached to the shaft 18 and operate inside of the blower casing 40. The blades 45 are cut away on one side as shown at 46, so that the blower device may not be encumbered should a vine accidentally be drawn into the machine.

The numeral 47 denotes generally, a suction head which is used when crimson clover seed is being harvested. The suction head 47 includes sides 48, a top 49 merging into a downwardly extended rear end 50, and a bottom 51, terminated short of the rear end 50, to define an opening 52 in the bottom of the suction head near to the rear end of the suction head. The suction head 47 has a flange 55, connected with the flange 42 by means of bolts 56 or the like. A shaft 53 is journaled in the suction head 47 and in the arms 25 and 24. The shaft 53 has any desired number of beating fingers 54 movable partly within the contour of the suction head 47 and coöperating with the opening 52. Secured to the end of the shaft 53 is a pulley 57 around which is trained a belt 58 engaged with a pulley 59 on the shaft 18.

In practical operation, when the engine 23 is in operation, the belt 20 will drive the shaft 18, the blades 45 of the blower device thus being operated. From the shaft 18, motion will be transmitted to the shaft 53 by means of the belt 58. The fingers 54 on the shaft 53 tend to separate and draw upwardly, the crimson clover from which the seed is to be harvested. The suction and blower device 40—45 creates a strong draft upwardly through the tubular chute 38, the seed being drawn into the casing 40 and being advanced, from the casing 40, through the pipe 44 into the receptacle 8.

The spring 35, coacting with the arms 30 and 28 on the rock shaft 29, and with the yoke 27, constitutes a means whereby the vertically swinging frame 24—25 which carries the tubular chute 38 and the suction head 47, is yieldingly supported. The suction head 47 will, therefore, at all times coöperate properly with the crop which is being harvested.

The frame 24—25 together with the chute 38 and the suction head 37 may be raised and lowered through the instrumentality of the rod or connection 31 and the lever 32, it being possible to engage the latch mechanism 34 with the segment 33 to hold the parts above enumerated in adjusted positions. The numeral 105 indicates a suitable yielding connection of any kind, interposed in the rod 31, so that the frame 24—25 may have the necessary vertical movement, when the spring 35 yields, it being obvious that if a rigid rod were used as a connection between the lever 32 and the arm 30, the spring 35 would be without function.

In Fig. 4 of the drawings, a slight modification of the invention has been shown. In this figure there is delineated a means whereby bur clover can be harvested more satisfactorily than can be done with the structure shown in Fig. 3. In Fig. 4 there is shown a suction head 63 connected by a flange 62, and bolts 61 with the flange 42 of the tubular chute 38, it being possible to use the suction head 63 in the place of the suction head 47. The suction head 63 includes sides 64, a top 65 having a depending rear lip 66, and a bottom 67 which is shorter than the top 65. The sides 64 are prolonged to form vertical wings 68. Secured to the rear edge of the bottom 67 is a flexible apron 69. Projecting rearwardly from the lip 66 is a plate 70 to which is hinged for vertical swinging movement, a closure 71 operating between the wings 68 and extending from wing to wing. The hinged connection between the closure 71 and the plate 70 is indicated at 72. The numeral 73 indicates arms corresponding to the parts 24 and 25, and slightly longer than these arms, the arms or bars being adapted to be mounted as are the arms 24 and 25 in Fig. 2. Journaled in the rear ends of the arms or bars 73 is a shaft 74 having beating fingers 75. The shaft 74 is actuated by a belt similar to the belt 58, but longer than the belt 58, owing to the different relative positions of the shafts 74 and 53. The numeral 76 indicates suitable connections between the arms or bars 73 and the suction head 63.

In practical operation, the device shown in Fig. 4, which is adapted to harvest bur clover seed, is drawn forwardly over the ground in a manner hereinbefore set forth. The apron 69 conforms readily to the height of the crop and to inequalities in the ground, and secures a strong and adequate suction through the head 63. The pivoted closure 71 follows along on top of the crop, between the wings 68 and insures a proper suction on the plants. When the shaft 74 is rotated, the fingers 75 tend to separate and loosen the clover plants, should they be matted, the fingers 75 operating on the plants near their lower ends, and while the suction is being applied to the plants. The fingers 75, like the parts 54 of Fig. 3 exert a marked action on the crop, and tend to loosen the seed, to some extent, so that the seed can be carried away by suction.

Having thus described the invention, what is claimed is:—

1. In a clover seed harvester, a vehicle; a receptacle carried by the vehicle; a frame mounted to swing vertically on the rear end of the vehicle; a suction and blower mechanism on the vehicle and discharging into the receptacle; a movable inlet member discharging into said mechanism and mounted at its rear end to move with the frame; a rotary beater journaled on the frame and coöperating with the rear end portion of the inlet member; a motor on the vehicle; means for operatively connecting the motor with the suction and blower mechanism; means for operatively connecting the suction and blower mechanism with the rotary beater; and means under the control of an operator and mounted on the vehicle, for raising and lowering the frame.

2. In a clover seed harvester, a vehicle; a receptacle carried by the vehicle; a frame mounted to swing vertically on the rear end of the vehicle; a suction and blower mechanism on the vehicle and discharging into said mechanism; a movable inlet member discharging into the receptacle and mounted at its rear end to move with the frame; a rotary beater journaled on the frame and coöperating with the rear end portion of the inlet member; a motor carried by the vehicle; means for connecting the motor with the suction and blower mechanism; means for connecting the suction and blower mechanism with the beater; means carried on the vehicle and under the control of an operator for raising and lowering the frame; and spring means operatively connected with the frame for supporting the frame yieldingly.

3. In a clover seed harvester, a vehicle; a receptacle carried by the vehicle; a frame mounted to swing vertically on the rear end of the vehicle; a suction and blower mechanism on the vehicle and discharging into the receptacle; a movable inlet member discharging into said mechanism and mounted at its rear end to move with the frame; a rotary beater journaled on the frame and coöperating with the rear end portion of the inlet member; means for operating the suction and blower mechanism; means for operating the beater; a rock shaft journaled on the vehicle; arms carried by the rock shaft; a yoke connecting one arm with the frame; an operating member mounted on the vehicle; a connection between the other arm and the operating member; an extension spring; means for connecting one end of the extension spring to the last specified arm; and means for connecting the other end of the extension spring with the vehicle.

4. In a clover seed harvester, a vehicle; a receptacle carried thereby; a frame mounted to swing vertically on the rear end of the vehicle; a suction and blower mechanism on the vehicle and discharging into the receptacle, the suction and blower mechanism including a shaft; a motor mounted on the vehicle; a belt forming an operative connection between the motor and the shaft of the suction and blower mechanism; a movable inlet member discharging into said mechanism and mounted at its rear end to move with the frame; a rotary beater journaled on the frame and coöperating with the rear end portion of the inlet member; a belt forming an operative connection between the rotary beater and the shaft of the suction and blower mechanism; a rock shaft mounted to swing on the vehicle and comprising arms; means for connecting one of said arms with the frame; an operating member carried by the vehicle; a yieldable connection between the operating member and the other of said arms; a retractile spring; means for connecting one end of the retractile spring with one of said arms; and means for connecting the other end of the retractile spring with the vehicle.

5. In a clover seed harvester, a vehicle; a receptacle carried by the vehicle; a frame mounted to swing vertically on the rear end of the vehicle; a suction and blower mechanism on the vehicle and discharging into the receptacle; a movable inlet member discharging into said mechanism and mounted at its rear end to move with the frame; a rotary beater journaled on the frame and coöperating with the rear end portion of the inlet member; means for operating the beater; means for operating the suction and blower mechanism; and means under the control of an operator and mounted on the vehicle, for raising and lowering the frame.

In testimony that I claim the foregoing as my own, I have hereto affixed my signature in the presence of two witnesses.

DAVID JACKSON PITTS.

Witnesses:
R. L. RICE,
W. A. RUCKER.